United States Patent [19]

Yatsunami

[11] 4,418,276
[45] Nov. 29, 1983

[54] OPTICAL BAR CODE READER

[75] Inventor: Kenrow Yatsunami, Yamatokoriyama, Japan

[73] Assignee: Sharp Kabushiki Kaisha, Osaka, Japan

[21] Appl. No.: 342,406

[22] Filed: Jan. 25, 1982

[30] Foreign Application Priority Data

Jan. 30, 1981 [JP] Japan .................................. 56-13228

[51] Int. Cl.³ .............................................. G06K 7/14
[52] U.S. Cl. .................................... 235/462; 235/464; 235/467
[58] Field of Search ................ 235/462, 464, 467, 463

[56] References Cited

U.S. PATENT DOCUMENTS 4,097,729  6/1978  Seligman ............................ 235/467

Primary Examiner—Harold I. Pitts
Attorney, Agent, or Firm—Birch, Stewart, Kolasch & Birch

[57] ABSTRACT

An optical bar code reader includes a detection system for detecting a large article on which a standard type bar code label is disposed, and a small article on which a reduced type or truncated type bar code label is disposed. When the large article is detected, the optical bar code reader is automatically placed in a coarse scanning mode. When the small article is detected, the optical bar code reader is automatically placed in a fine scanning mode.

4 Claims, 15 Drawing Figures

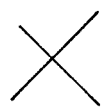 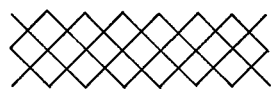 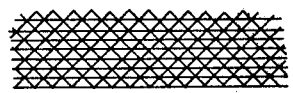
FIG.6  FIG.7  FIG.8
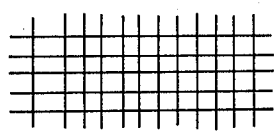 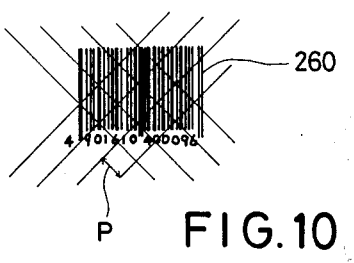
FIG.9  FIG.10
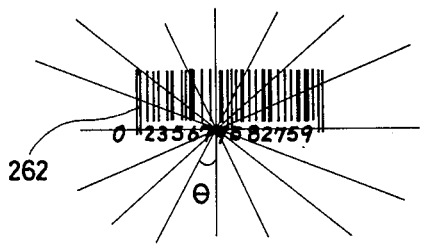
FIG.11
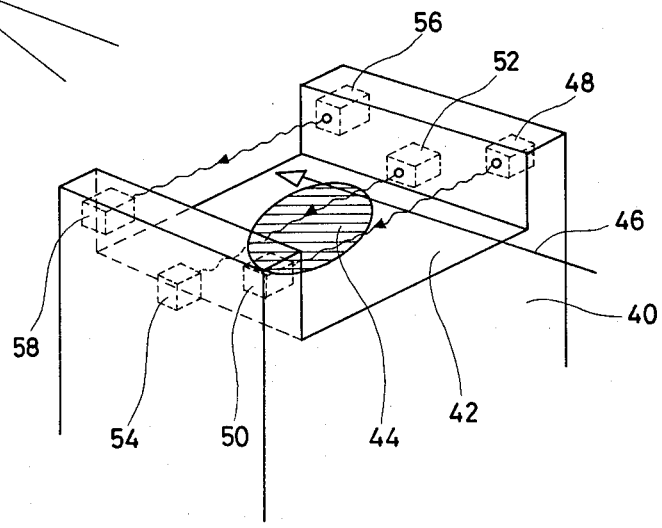
FIG.12

OPTICAL BAR CODE READER

BACKGROUND AND SUMMARY OF THE INVENTION

The present invention relates to an optical bar code reader and, more particularly, to a control system for selectively operating the optical bar code reader in two different two operation modes.

Recently, the point of sales (POS) system has been developed, wherein coded information related to a commodity price and a commodity classification is printed on a tag card attached to a commodity article, and the coded information is read out through the use of an optical reader system.

Generally, the bar code is classified into two groups. The first group is the source marking type, wherein the bar code label is attached to the article by the manufacturers who manufactures the article. In the source marking system, the bar code size is fixed in accordance with, for example, the Japanese Industrial Standard (JIS). The second group is the instore marking type, wherein the bar code label is attached to the article by a store who sells the article. In the instore marking system, there is a possibility that a specific code notation other than the standard notation determined by JIS may be used. Further, in the case of small articles, the reduced type bar code or the truncated type bar code is used, which requires a fine pitch reading.

Accordingly, an object of the present invention is to provide a control system in an optical bar code reader for selectively operating the optical bar code reader in different operation modes.

Another object of the present invention is to provide a control system in an optical bar code reader for operating the optical bar code reader in a fine pitch mode when a small article is placed on the optical bar code reader.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a first detection unit is disposed near a scanning window, which develops a first detection signal for operating the optical bar code reader in a coarse pitch mode when a large article is placed on the scanning window. A second detection unit is disposed above the scanning window for operating the optical bar code reader in a fine pitch mode when a small article is disposed on the scanning window.

A typical construction of an optical bar code reader which selectively operates the coarse pitch mode and the fine pitch mode is disclosed in copending application Ser. No. 226,864, "OPTICAL BAR CODE READER" filed on Jan. 21, 1981 by Syoichi Yasuda, Takaaki Okamoto, Kenrow Yatsunami, Shigeo Terashima, Masahiro Horii, Yoshihiko Iwamoto and Kiyotsugu Amasaki and assigned to the same assignee as the present application. The German counterpart was published on Nov. 26, 1981 as DOS No. 3,101,827.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 6, 7, 8 and 9 are schematic plan views showing examples of typical scanning beams in the optical bar code reader of FIG. 1;

FIGS. 10 and 11 are schematic plan views showing examples of scanning beams for reading the information on the reduced type bar code or the truncated type bar code;

FIG. 12 is a perspective view of an essential part of an embodiment of an optical bar code reader of the present invention;

DESCRIPTION OF THE PREFERRED EMBODIMENTS

Figure 1:
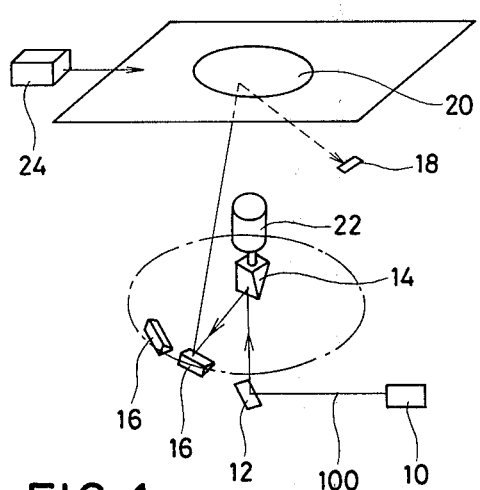
FIG. 1 is a schematic perspective view of an optical bar code reader of the prior art.

A typical construction of a conventional optical bar code reader will be first described with reference to FIG. 1.

Figure 2:
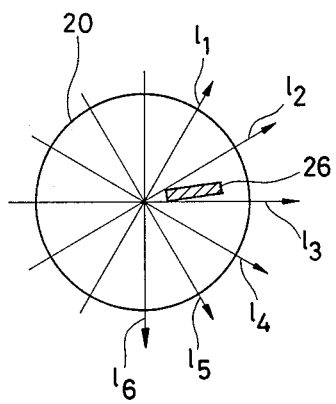
FIG. 2 is a schematic plan view showing an example of scanning beams in the optical bar code reader of FIG. 1.

The conventional optical bar code reader comprises a light source 10, a galvanomirror 12, a rotating mirror 14, a plurality of stationary mirrors 16 and a light responsive element 18. A light beam 100 emitted from the light source 10 is directed to the galvanomirror 12 which is driven to rotate by a drive system to adjust the location of a scanning beam on a scanning window 20. The light beam reflected by the galvanomirror 12 is applied to the rotating mirror 14 which is driven to rotate by a motor 22. The plurality of stationary mirrors 16 are aligned in a semicircular fashion to provide the scanning beams $l_1$ through $l_6$, on the scanning window 20, as shown in FIG. 2. A commodity article 24, on which a bar code label is disposed, is disposed on the scanning window 20 in order to read the bar code information through the use of the light responsive element 18.

A typical control system of the above-mentioned conventional optical bar code reader is disclosed in U.S. Pat. No. 3,978,317, "OPTICAL BAR CODE READER", issued on Aug. 31, 1976.

Generally, there are two types of bar code, namely, the source marking type and the instore marking type. The bar code of the source marking type has a fixed size determined by, for example, the Japanese Industrial Standard (JIS). In the case of small articles, the reduced type bar code or the truncated type bar code is used. Further, the bar code of the instore marking type is normally the smaller type.

Figure 3:
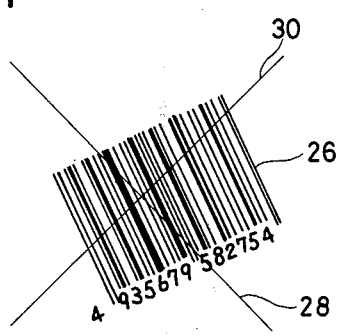
FIGS. 3, 4 and 5 are schematic plan views showing relationships between the standard bar code and the scanning beams in the optical bar code reader of FIG. 1.

To read out the information recorded on a bar code label 26, at least one scanning beam must cover the bar code label 26 over the entire width of the bar code label 26. FIG. 3 shows two scanning beams 28 and 30. The scanning beam 28 does not extend over the entire width of the bar code label 26 and, therefore, the scanning beam 28 is treated as an invalid scanning beam. The scanning beam 30 extends over the entire width of the bar code label 26 and, therefore, the information read by the scanning beam 30 is applied to a control system for recognition purposes.

Figure 4:
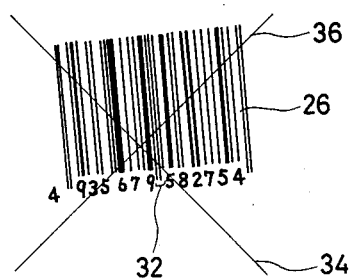

Generally, the bar code label 26 includes a center bar 32 as shown in FIG. 4. The left half part of the bar code label 26 is covered by a scanning beam 34. The right half part of the bar code label 26 is covered by a scanning beam 36. The information read by the scanning beams 34 and 36 is combined with each other to obtain the complete information.

Figure 5:
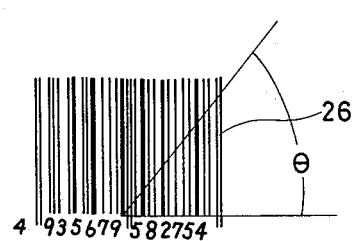

The standard bar code label 26 has a height, as shown in FIG. 5, wherein the angle $\theta$ is about 51°. Therefore, at least two scanning beams crossing at a right angle are sufficient to read the information in a manner as shown either in FIG. 3 or in FIG. 4.

To ensure an accurate reading, various types of the scanning beams are proposed. FIG. 6 shows the cross-X type scanning beams. FIG. 7 shows the compound-X type scanning beams. FIG. 8 shows the saturation type scanning beams. FIG. 9 shows the cross hatch type scanning beams.

FIG. 10 shows a reduced type bar code label 260. It will be clear that scanning beams of a short pitch P are required to read the information recorded on the reduced type bar code label 260. FIG. 11 shows a truncated type bar code label 262. It will be clear that scanning beams of a small scanning angle $\theta$ are required to read the information recorded on the truncated type bar code label 262.

The fine scanning reading is desirable to read the information recorded on the reduced type bar code label and the truncated type bar code label. However, the fine scanning reading requires a long period of time to complete the reading operation. Thus, the fine scanning reading is not suited for reading the information recorded on the standard type bar code label.

In accordance with the present invention, a detection system is provided for detecting the size of an article to which the bar code label is attached. When a large size article is detected, the optical bar code reader is automatically placed in the coarse scanning reading mode. When a small size article is detected, the optical bar code reader is automatically placed in the fine scanning reading mode. A typical operation of the coarse scanning reading and the fine scanning reading is disclosed in copending application Ser. No. 226,864, "OPTICAL BAR CODE READER", filed on Jan. 21, 1981 by Syoichi Yasuda, Takaaki Okamoto, Kenrow, Yatsunami, Shigeo Terashima, Masahiro Horii, Yoshihiko Iwamoto and Kiyotsugu Amasaki and assigned to the same assignee as the present application.

FIG. 12 schematically shows the detection system for detecting the size of an article in an embodiment of an optical bar code reader of the present invention.

An optical bar code reader 40 includes a table 42 for supporting the article on which the bar code label is disposed. A scanning window 44 is provided on the table 42, and the article travels in a direction shown by an arrow 46. A first detection unit including a light emitting element 48 and a light responsive element 50 is disposed upstream of the scanning window 44. When the article reaches the first detection unit, the light responsive element 50 develops a first detection signal to activate the optical bar code reader in the coarse scanning mode.

A second detection unit including a light emitting element 52 and a light responsive element 54 is disposed above the scanning window 44. The second detection unit is secured at a position lower than the first detection unit so that the small article is not detected by the first detection unit but is detected by the second detection unit. When the small article is detected by the second detection unit, the light responsive element 54 develops a second detection signal to activate the optical bar code reader in the fine scanning mode.

A third detection unit including a light emitting element 56 and a light responsive element 58 is disposed at the downstream of the scanning window 44. When the article reaches the third detection unit, the light responsive element 58 develops a third detection signal to complete the reading operation.

Figure 13:
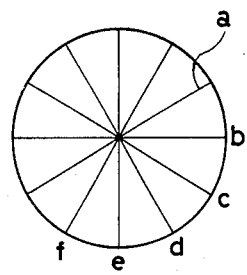
FIGS. 13 and 14 are schematic plan views showing examples of scanning beams used in the optical bar code reader of FIG. 12.
Figure 14:
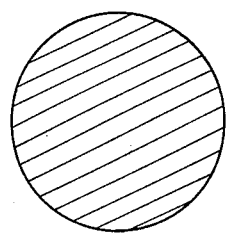

In the coarse scanning mode, scanning beams as shown in FIG. 13 are generated in response to the above-mentioned first detection signal. The first detection unit detects a large article to which the standard type bar code label 26 is secured. For reading the bar code information recorded on the reduced type bar code label 260 or the truncated type bar code label 262, a small article is disposed stationary on the scanning window 44. The light responsive element 54 in the second detection unit develops the second detection signal to conduct the fine scanning reading. FIG. 14 shows a group of scanning beams derived from the scanning beam a of FIG. 13. Other groups of scanning beams are generated for each of the scanning beams b through f of FIG. 13.

Figure 15:
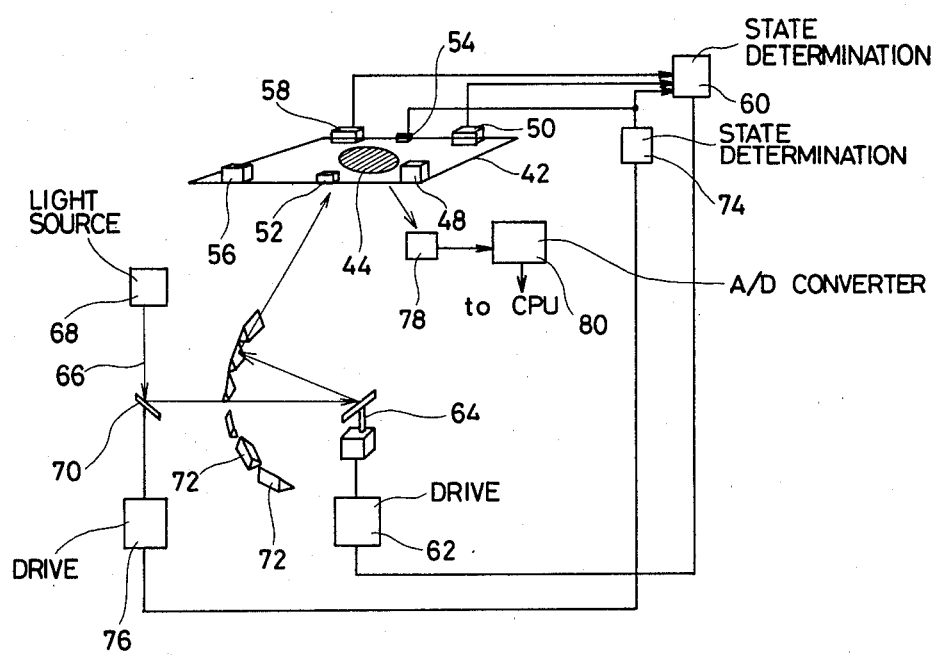
FIG. 15 is a schematic perspective view of an embodiment of an optical bar code reader of the present invention.

FIG. 15 shows an embodiment of an optical bar code reader of the present invention. Like elements corresponding to those of FIG. 12 are indicated by like numerals.

The first detection signal developed from the light responsive element 50 included in the first detection unit is applied to a first state determination circuit 60 which develops a first control signal to activate a first driver circuit 62 to rotate a rotating mirror 64. A light beam 66 emitted from a laser beam source 68 is applied to the rotating mirror 64 via a galvanomirror 70. The light beam reflected by the rotating mirror 64 is sequentially applied to stationary mirrors 72, thereby creating the scanning beams as shown in FIG. 13 on the scanning window 44. The above-mentioned operation relates to the reading operation for reading the standard type bar code label 26.

When a small article is disposed on the scanning window 44, the light responsive element 54 included in the second detection unit develops the second detection signal. The second detection signal is applied not only to the first state determination circuit 60 but also to a second state determination circuit 74. The second state determination circuit 74 develops a second control signal to activate a second driver circuit 76, thereby vibrating the galvanomirror 70. The vibration of the galvanomirror 70 creates the scanning beams as shown in FIG. 14. In this way, the fine scanning reading is conducted in response to the second detection signal.

The light beam reflected by the bar code label is applied to a light responsive element 78. The detection signal derived from the light responsive element 78 is applied to an analog-to-digital converter 80 which develops a digital signal representing the bar code information. The digital signal is applied to a central processor unit for recognition purposes. The central processor unit is preferably implemented with "Z-80 CPU" manufactured by SHARP CORPORATION, assignee of the present application.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An optical bar code reader which selectively operates in a coarse scanning mode and a fine scanning mode for reading a bar code label, said optical bar code reader comprising:

detection means for detecting the kind of said bar code label;

determination means for selectively developing a first control signal and a second control signal in response to an output signal of said detection means; and control means for selectively placing the optical bar code reader in said coarse scanning mode in response to said first control signal, and in said fine scanning mode in response to said second control signal.

2. The optical bar code reader of claim 1, wherein said detection means comprises an optical detection system for detecting the size of an article on which said bar code label is disposed.

3. The optical bar code reader of claim 2, wherein said optical detection system comprises:

a first detection system for detecting a large article and developing a first detection signal; and a second detection system for detecting a small article and developing a second detection signal.

4. The optical bar code reader of claim 3, wherein said determination means develops said first control signal in response to said first detection signal, and develops said second control signal in response to said second detection signal.

* * * * *